H. PRATT & T. T. MUNHALL.
Trucks.

No. 145,967. Patented Dec. 30, 1873.

Scale. 12 inc.

Witnesses
John Armstrong
Jos. Wagner

Hiram Pratt
by E. Thurlow
his atty in fact
Thomas T. Munhall
by E. Thurlow
his atty in fact

UNITED STATES PATENT OFFICE.

HIRAM PRATT AND THOMAS T. MUNHALL, OF FAIRBURY, ILLINOIS.

IMPROVEMENT IN TRUCKS.

Specification forming part of Letters Patent No. 145,967, dated December 30, 1873; application filed July 21, 1873.

*To all whom it may concern:*

Be it known that we, HIRAM PRATT and THOMAS T. MUNHALL, both of Fairbury, in the county of Livingston and State of Illinois, have invented a Clutch-Truck for Warehouses or Railroad-Stations; and do hereby declare that the following is a full, clear, and exact description thereof, reference being had to the annexed drawings, making a part of this specification, in which like letters of reference refer to like parts, and in which—

Figure 1:
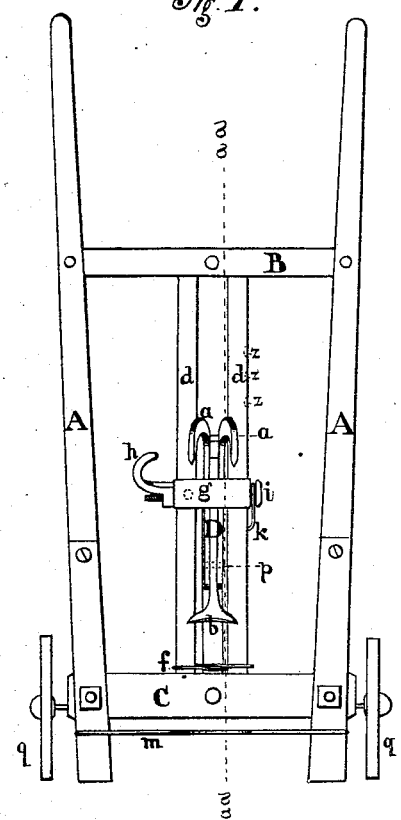
Figure 3:
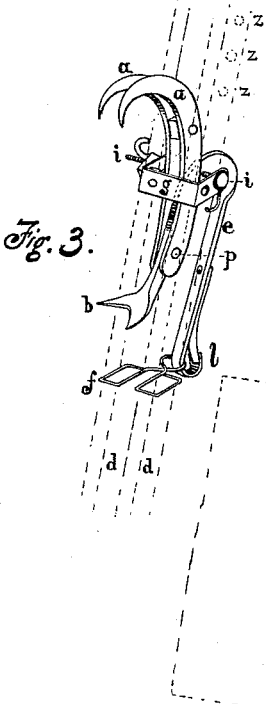
Figure 2:
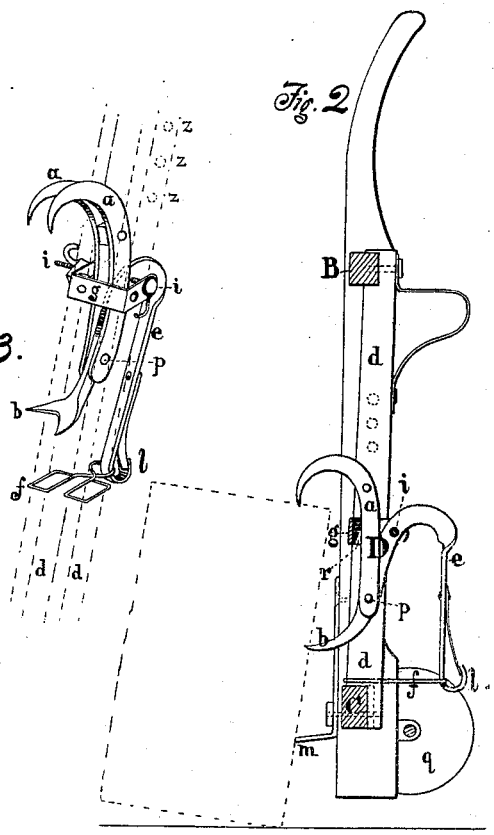
Figure 4:
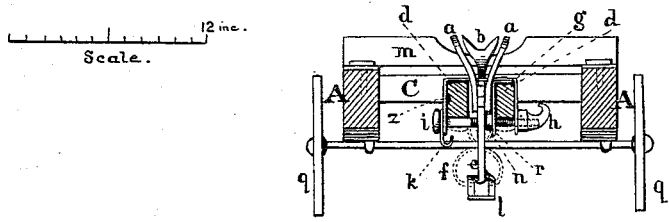

Figure 1 represents a superficial or plan view of the truck; Fig. 2, a side vertical section along the dotted lines $a\ a\ a\ a$, Fig. 1; Fig. 3, a perspective view of the clutch and its attachments, the dotted lines representing the central bars of the truck; Fig. 4, a cross-section of the truck between the clutch and the bar B, showing an end view of the clutch and its attachments.

This invention relates to providing a common warehouse hand-truck with two parallel central bars, running longitudinally of the same, to carry a sliding double clutch for picking up goods or boxes without manual interference with the latter. Each end of the clutch has double points, which project above the bed of the truck, the latter being placed upright against the box or barrel to be removed. The upper points of the clutch enter the upper surface or horizontal part of the former, by pressure downward, at the same time that the lower points of the clutch enter the sides of the box or barrel, &c., thus seizing and picking up for transportation said articles without manual touch. One of the forms in which I construct the clutch I will now describe.

In the drawings, A A represent the side bars of a truck, which has the usual end wheels $q\ q$ near the scoop-plate $m$; B C, the upper and lower cross-bars; $d\ d$, central longitudinal bars fastened permanently at both ends to the cross-bars B C, in any secure mode. These bars should be thicker in the direction of the superincumbent weight to be borne. D represents the double clutch pivoted between the bars $d\ d$, and is composed of an S-shaped clutch or lever, $b\ e$, pivoted near its upper curve on a pin, $i$, which passes beneath the bars $d\ d$, and through a sliding staple or plate, $g$, which clasps the upper surface and outer sides of the bars $d\ d$. The curve of the upper end of the clutch $e$ is continued in an arm, $l$, running parallel with the under surface of the bars $d\ d$ to a point a little below the lower or opposite end of the clutch, and there terminates in a snap-hook, or similar catch, from which a ring or sliding loop, $f$, extends in a double loop over and embraces the bars $d\ d$, along which they slide. To this clutch $b\ e$, near its lower double point, is pivoted, at $p$, its fellow clutch or part $a\ a$, which consists of two similar parallel parts placed on either side of the lower clutch $b\ e$, between said bars $d\ d$, and is secured near its curved points by a block between the two parts, and a pin or bolt. The two parallel parts of this upper clutch resemble the letter J, the curve of the letter representing the clutching-points. These project, as well as the points of the lower clutch, above the bed of the truck. The opposite ends of this upper clutch $a\ a$ are pivoted by a pin, $p$, on either side of the other clutch $b\ e$. The sliding staple or pivot plate $g$ has a third arm, $r$, projecting between the clutch and one of the bars $d$, to form a point against which to force the set-nut $n$, when the auxiliary nut or thumb-piece $h$ is used, to set the whole clutch D at a desired point on the bars $d\ d$. For this purpose also a hook, $k$, hung upon the end of the pin $i$, is used, by inserting the hook in any of the recesses $z\ z\ z$ in the side of one of the bars $d\ d$. The terminal scoop-plate $m$ should have a curved recess taken out of its middle, as shown, so as to receive and steady the weight of a barrel or other rounded object.

The operation of this clutch-truck is as follows: The placing of a box, or similar object, for deportation on this truck is unnecessary, as the clutch itself picks up the box, barrel, or other goods. This is done by setting the bed of the truck in an upright position against the side of a box—for instance, first setting the staple $g$, by means of the nut $h$, at the proper height, so that when the truck is raised an inch or so from the floor or ground, the points of the upper clutch $a\ a$ will be driven, by the weight of the same, slightly into the box, upon which the foot of the truckman is pressed against the arm $e$ of the lower clutch, which act drives the points of this clutch into the sides of the box, at the same time that the gravitating ring or loop $f$ keeps the said arm from springing outward toward the truckman or operator. The box is now secured upon the truck, and upon pulling the handles of the latter toward the operator the former is ready to be wheeled away. The action of this clutch is to draw the upper and lower points of the clutch toward each other after penetrating the box, thus gaining a good hold upon the latter, which is retained until the box is set down, and the pressure of the operator's hands against the truck-handles throws the lower clutch out of the box, which releases also the upper clutch.

What we claim as our invention is—

In a double-clutch hand-truck, the two longitudinal bars $d\ d$, the sliding staple $g$, pivot-pin $i$, with its catch $k$, the S-shaped double-pointed hook $b\ e$, with its spring-arm $l$ hooked to the sliding ring $f$ on the bars $d\ d$, pivoted by pin $p$ to and between the double hook $a\ a$, all combined to operate in connection with the truck-head $m$, as described.

In testimony that we claim the foregoing clutch-truck, we have hereunto set our hands this 10th day of July, 1873.

HIRAM PRATT.
THOMAS T. MUNHALL.

Witnesses:
H. W. WELLS,
JAS. WAGNER.